United States Patent
Singh et al.

(10) Patent No.: US 9,465,820 B2
(45) Date of Patent: Oct. 11, 2016

(54) METHOD AND SYSTEM FOR UNIFIED TECHNOLOGICAL STACK MANAGEMENT FOR RELATIONAL DATABASES

(71) Applicant: Cellco Partnership, Basking Ridge, NJ (US)

(72) Inventors: Shivinder Singh, Woodbury, MN (US); Madhu Bhimaraju, Bridgewater, NJ (US); Krishna Reddy, Irvine, CA (US)

(73) Assignee: Cellco Partnership, Basking Ridge, NJ (US)

( * ) Notice: Subject to any disclaimer, the term of this patent is extended or adjusted under 35 U.S.C. 154(b) by 364 days.

(21) Appl. No.: 14/078,694

(22) Filed: Nov. 13, 2013

(65) Prior Publication Data

US 2015/0134703 A1    May 14, 2015

(51) Int. Cl.
*G06F 17/30* (2006.01)
*G06F 7/00* (2006.01)

(52) U.S. Cl.
CPC ... *G06F 17/30289* (2013.01); *G06F 17/30174* (2013.01); *G06F 17/30575* (2013.01)

(58) Field of Classification Search
CPC .......... G06F 17/30575; G06F 17/30174; G06F 17/30289; G06F 17/30292; G06F 17/30864; G06F 17/30339; G06F 17/30312; G06F 17/30321; G06F 17/30917; G06F 17/30091; G06F 17/30336
See application file for complete search history.

(56) References Cited

U.S. PATENT DOCUMENTS

| | | | | |
|---|---|---|---|---|
| 5,987,506 A * | 11/1999 | Carter | ................... | G06F 9/5016 707/999.01 |
| 6,839,740 B1 * | 1/2005 | Kiselev | ................. | G06F 3/0607 709/214 |
| 7,203,801 B1 * | 4/2007 | Sharma | ................. | G06F 3/0611 711/148 |
| 7,647,329 B1 * | 1/2010 | Fischman | ......... | G06F 17/30094 707/999.1 |
| 7,653,699 B1 * | 1/2010 | Colgrove | .......... | G06F 17/30067 709/213 |
| 7,698,289 B2 * | 4/2010 | Kazar | ............... | G06F 17/30067 707/802 |
| 2013/0166855 A1 * | 6/2013 | Batwara | ................ | G06F 3/0608 711/154 |
| 2014/0006685 A1 * | 1/2014 | Peterson | ............. | G06F 12/0238 711/102 |
| 2015/0269239 A1 * | 9/2015 | Swift | ................ | G06F 17/30584 707/610 |

* cited by examiner

*Primary Examiner* — Dung K Chau

(57) ABSTRACT

An approach is described for providing unified technological stack management (e.g., via a global storage instance) where metadata is delocalized from storage nodes. The approach includes creating a global storage instance, wherein the global storage instance contains metadata for a storage layer including a plurality of storage nodes, and wherein the global storage instance is delocalized from the plurality of storage nodes. The approach also includes receiving a database operation request from an operating system layer. The approach further includes mediating the database operation request between the operating system layer and the storage layer using the global storage instance.

14 Claims, 20 Drawing Sheets

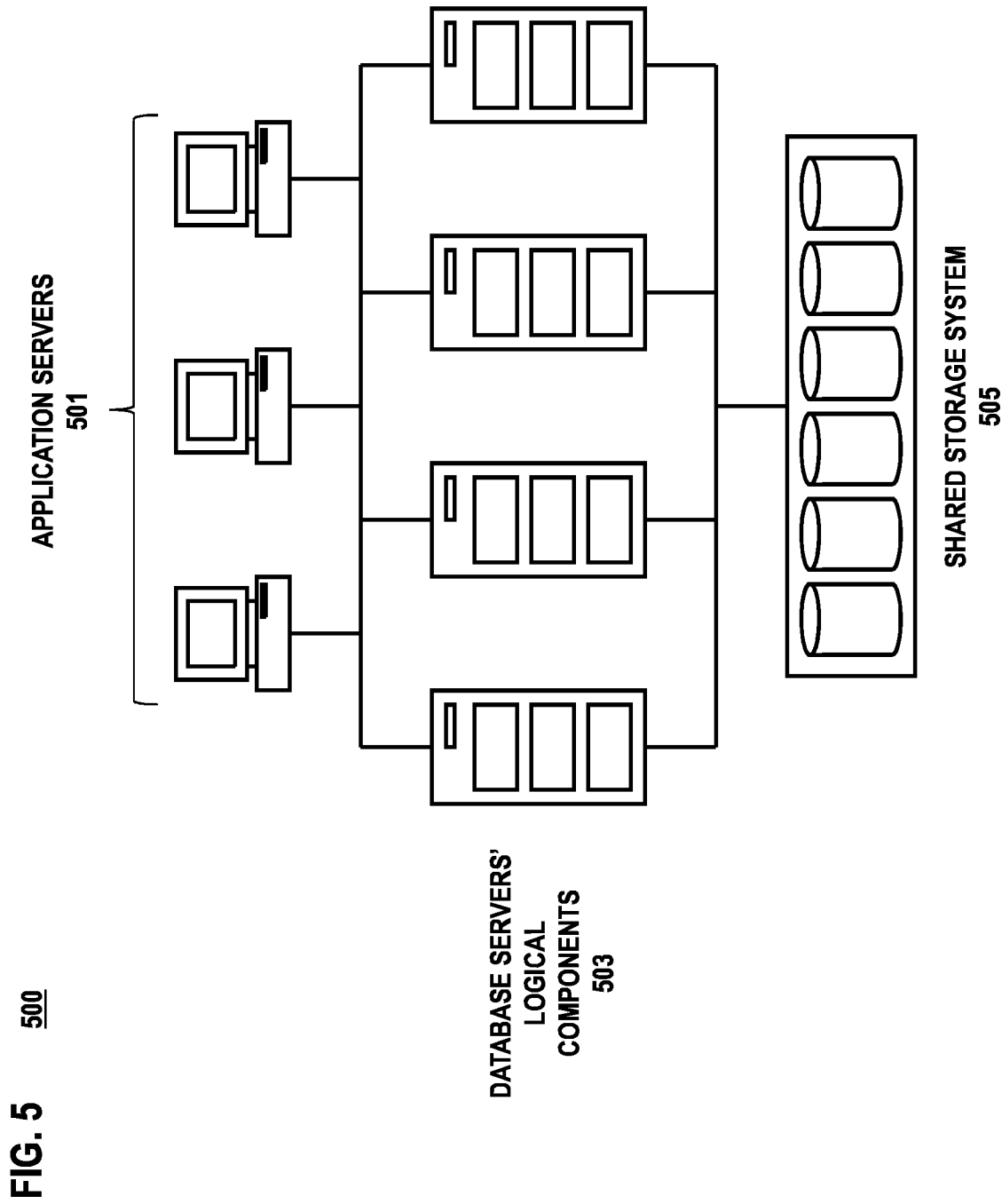

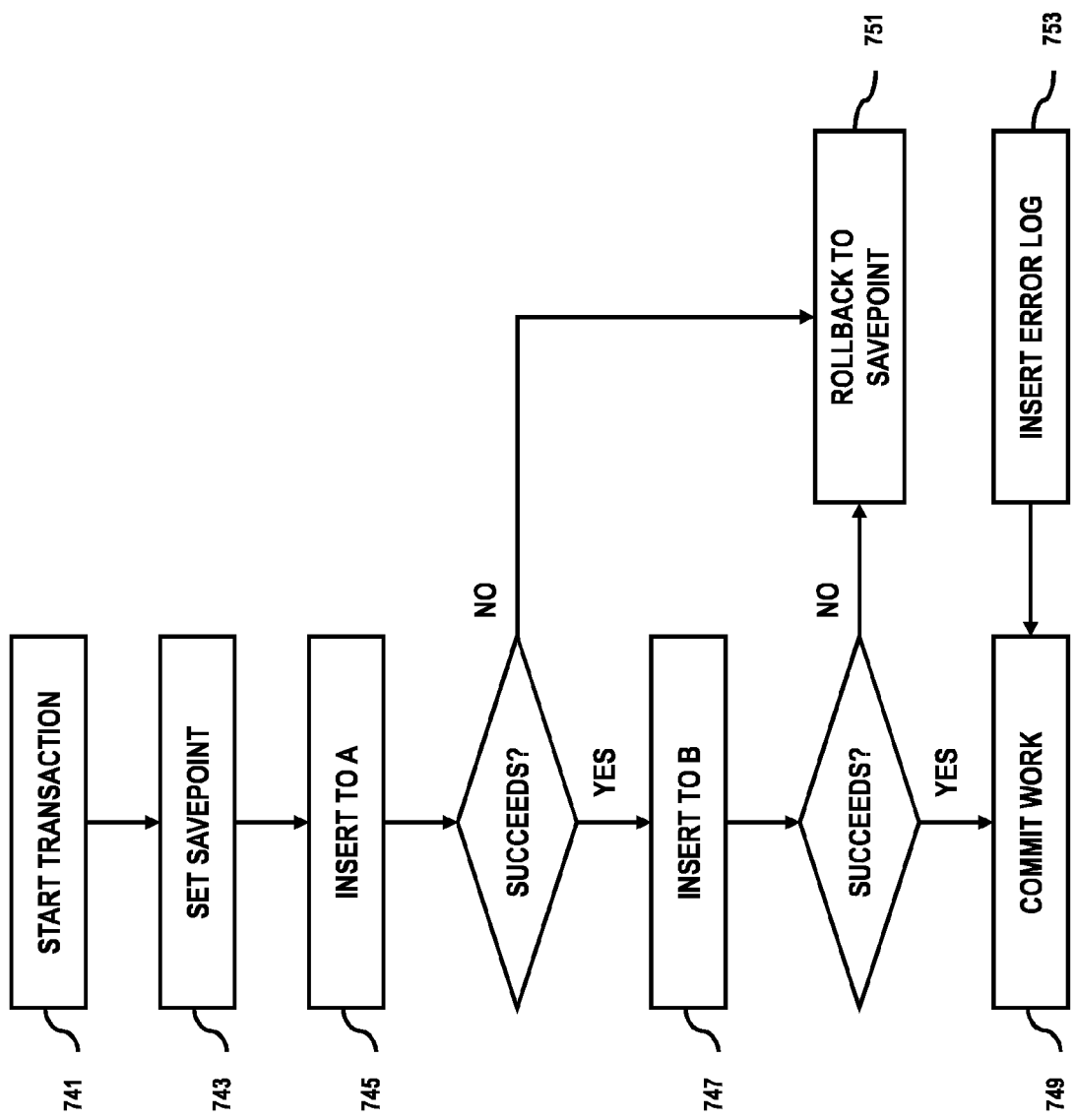

METHOD AND SYSTEM FOR UNIFIED TECHNOLOGICAL STACK MANAGEMENT FOR RELATIONAL DATABASES

BACKGROUND INFORMATION

Service providers are continually challenged to deliver value and convenience to consumers by, for example, providing compelling network services. One area of development has been expanding communication between relational databases. For example, operating files and metadata are managed locally at data centers and nodes within data centers. Nodes in the same vicinity may be connected for the nodes to coordinate. Data center communication takes place at clusters of database nodes within data centers or, at best, geographically neighboring data centers. Storage modules with data centers cannot communicate across vast geographic regions and data centers. As such, service providers face challenges in scaling operations beyond individual data centers and storing data across data centers where the nodes are not in close proximity.

Based on the foregoing, there is a need for providing unified technological stack management (e.g., via a global storage instance) where metadata is delocalized from storage nodes within data centers.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a model where logical or memory components of a database are split from application servers, according to an exemplary embodiment;

FIG. 7C is a flowchart of a communication amongst the layers in model 700 that leads to creation of a storage location, according to an exemplary embodiment;

DESCRIPTION OF THE PREFERRED EMBODIMENT

An apparatus, method, and software for providing unified technological stack management (e.g., via a global storage instance) where metadata is delocalized from storage nodes, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to processing cloud computing and services, it is contemplated that these embodiments have applicability to other computing technologies and architectures.

Figure 1:
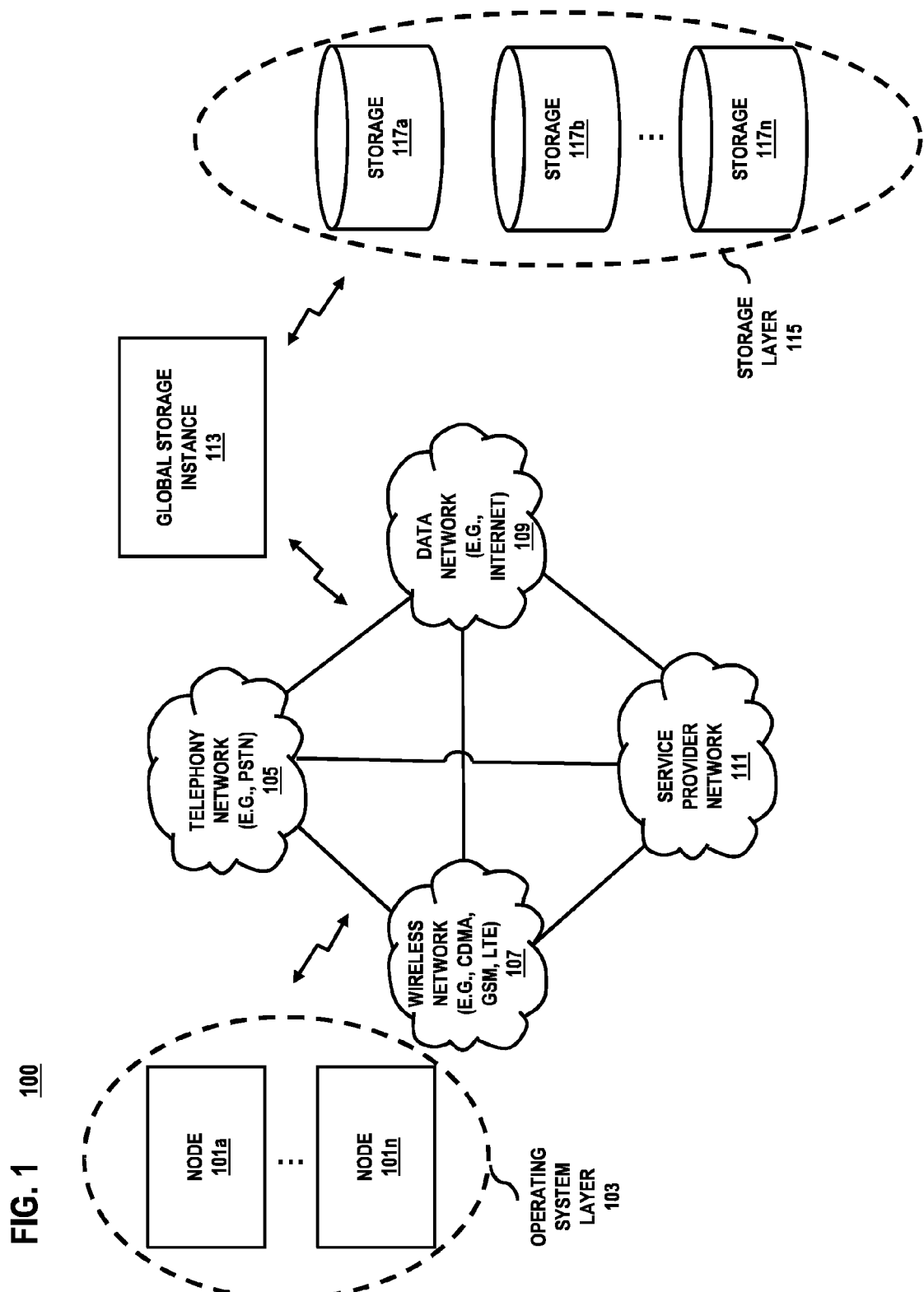
FIG. 1 is a diagram of a system capable of providing unified technological stack management (e.g., a global storage instance) where metadata is delocalized from storage nodes, according to an exemplary embodiment.

FIG. 1 is a diagram of a system 100 for providing unified technological stack management (e.g., via a global storage instance) where metadata is delocalized from storage nodes, according to one embodiment. For the purpose of illustration, system 100 for providing unified technological stack management (e.g., via a global storage instance) where metadata is delocalized from storage nodes, for example, nodes 101a-101n (or nodes 101). In one embodiment, nodes 101 may comprise an operating system layer 103. Nodes 101 may comprise user devices, data centers, databases, or any entity that may support an operating system. According to certain embodiments, nodes 101 may communicate over one or more networks, such as telephony network 105, wireless network 107, data network 109, and/or service provider network 111. In one embodiment, the nodes 101 communicate over the networks with each other, as well as a global storage instance 113 and storage layer 115. Storage layer 115 may comprise multiple storage components, for instance, storage 117a, 117b-117n (or storage 117). In some embodiments, the storage layer 115 may contain several storage components, grouped in different sets. While specific reference will be made hereto, it is contemplated that system 100 may embody many forms and include multiple and/or alternative components and facilities.

It is observed that scalability of relational database management systems (RDBMS) is constrained by the need for nodes to be in close proximity to each other in order to coordinate amongst one another. The need for geographical proximity for interaction limits the ability of RDBMS to act across geographic areas and manage resources (e.g., distribute storage across data centers). Traditionally, RDBMS rely on a client server model. In this model, a client or end user initiates a transaction represented by a SQL (Structured Query Language) query. The query is then passed to a database that would process the query, retrieve the results set, and pass it back to the user. To prevent the entire transaction from shutting down if the case of any database failure, logical or memory components of the database were split out from the database. This way, the logical or the memory components could run on multiple servers so that even if machines were down, remaining nodes could carry out the transaction and the end user would not be impacted. However, this model was limited by requiring the servers to be in a single data center, connected via a shared storage. Requiring servers to be in a single data center translates into space constraints since it may be hard to sustain multiple databases within a single data center, especially given the growth in size of databases. Connecting only servers within a single data center also means that resources available at distant data centers may not be leveraged for use.

To overcome this limitation, the next development was to capture operating system (OS)-related metadata within a storage instance (SI) and conduct communication between nodes, OS, and storage, with the metadata in the SI. In this embodiment, the SI lives on each node in a database cluster. When the SI receives a request, it may check with an OS kernel and storage layer, then take action based on the request. After the action from the request is completed, the metadata across the cluster nodes and SIs are updated and the SIs are synchronized to account for the action. However, the metadata that permits execution of the action and communication amongst the nodes, OS, and storage layer, are still local and contained within each data center. The OS files and metadata are managed locally by each node in the cluster, meaning that nodes must be proximate each other and connected by high speed interconnects to coordinate the information among them. The requirement for physical proximity limits the scalability of RDBMS systems using this model.

Therefore, the approach of system 100, according to certain exemplary embodiments, stems from the recognition that further scalability of RDBMS hinges on separating metadata from their local nodes. The system 100 proposes creating a global repository that can manage the metadata of all the nodes in a database cluster. In one embodiment, the global repository may be known as a global storage instance (GSI) 113, where the GSI 113 acts as a repository that contains the metadata of all the nodes of a database cluster in a centralized location. In one embodiment, the metadata may include metadata that permits information about a file system object needed to respond to end user requests. For example, the GSI 113 may provide metadata needed to locate nodes and file content relevant to executing a user transaction. The metadata may include storage extents of records and/or database pointers. Such metadata may be used to retrieve the actual file content from nodes to complete the transaction. In keeping the metadata in a GSI 113, metadata is delocalized from nodes 101 so that metadata management takes place across the operating system layer, rather than at individual nodes 101. This way, nodes no longer have to be geographically close to one another to communicate. This way, storage in system 100 may also be remote. With localized management, metadata is local to each node, so storage much also be proximate the node. Since metadata is decoupled from nodes while employing a GSI 113, storage can be in a different location from nodes and still have the metadata to retrieve file content. Then, system 100 also allows for storage 117 to be added to the storage layer 115 or storage in geographically different locations from nodes 101 to be employed by nodes 101. The need for storage 117 to be proximate nodes 101 is not necessary since metadata to request file content from storage 117 is centralized the GSI 113.

After completing a user transaction, metadata may be updated to reflect the completion. In this way, the GSI 113 may act as an intermediary between the operating system layer 103 and the storage layer 115. For example, the GSI 113 may receive a request for a logical structure command related to a database operation. Then, the GSI 113 may check the storage layer 115 for storage extents related to the operation. In one embodiment, the GSI 113 may further perform the logical structure command at the storage layer 115. Upon completion of the command and operation, the GSI may account for the storage space available in system 100 (e.g., at nodes 101) and rebalance metadata and storage across all the nodes.

In a further embodiment, the GSI 113 may act in a master-slave configuration with local storage instances. For example, each node 101a-101n may house a local storage instance with metadata contained only within the respective node 101a-101n. In other words, the local storage instance may house local metadata. In some embodiments, the GSI 113 may check local storage instances for file location information and check the storage layer 115 for storage extents in response to a request. In one embodiment, user transaction requests (e.g., database operation requests) may be evaluated, first, by local storage instances before they are passed to GSI 113. For example, a GSI 113 may communicate with the local storage instances and operating system layer 103 via custom algorithms. In these cases, local storage instances may also pass local metadata for file location to GSI 113 along with the request. After operation completion, the GSI 113 may take the additional step of updating local metadata at the local storage instances, based on the operation involved with the request. In one scenario, the GSI 113 may also communicate with the storage layer 115 via custom algorithms to act as the intermediary between local storage instances at nodes 101 and the storage 117. Furthermore, the GSI 113 may rely on custom algorithms to update metadata in the GSI 113 and local metadata at local storage instances.

This method of keeping metadata in a global repository overcomes the need for nodes to be geographically proximate one another and storage components. The method also permits metadata management across entire clusters of nodes 101 in the operating system layer 103. For instance, the GSI 113 may have an overview of the storage space and allocations across an entire cluster of nodes 101 and rebalance metadata at nodes 101 after completion of an operation based on the storage space allocations. Previously, rebalancing was local and/or nodes performing an operation were updated with metadata for completed operations. At best, nodes corresponding the nodes performing the operation were likewise updated or part of the rebalancing. However, only nodes that were proximate one another could be connected to communicate. With a GSI 113, all the storage space in a cluster may be utilized to store updates after operations are completed.

In one embodiment, the nodes 101 may communicate with users and/or one another. For instance, nodes may include user devices that directly plug into a system. At which case, requests at nodes 101 may comprise user interactions with respective nodes. In another embodiment, nodes 101 may also comprise data centers. Essentially, nodes 101 may comprise any device that may support a database and an operating system. In one embodiment, nodes 101 may freely enter and exit the operating system layer 103 based on user transaction and/or database operation requests. For example, if nodes 101 request access to a particular storage 117, the GSI 113 may determine the nodes 101 joining the operating system layer 103 and direct the communication between the nodes 101 and the particular storage 117.

In one embodiment, the operating system layer 103 may comprise a collection of nodes 101. In one embodiment, the operating system layer 103 may allow for the addition of nodes 101. For example, the operating system layer 103 may connect to networks 105-111 and GSI 113 to execute user transactions using data objects in the storage layer 115. In one scenario, any nodes 101 requiring access to data objects in the storage layer 115 may join the operating system layer 103 and thus come to communicate with the GSI 113, which orchestrates the communication. In one embodiment, the operating system layer 103 may comprise any nodes 101 that use the same operating system. In another embodiment, the operating system layer 103 may include only nodes 101 that actively interface with the storage layer 115. In one embodiment, the operating system layer 103 may stand for a database cluster, containing all the nodes 101 in such a database cluster. For example, the cluster may exist in a centralized location.

In one embodiment, the GSI 113 may act as a global repository that contains the metadata of all the nodes 101. For example, the GSI 113 may serve as a centralized location with metadata indicating information about a file system object. In one scenario, such metadata may include file type, device node, file ownership, access information, meaning information referring to where a file's data content may be located within the storage layer 115. In storing such metadata, the GSI 113 holds metadata such that the GSI 113 may retrieve the file at the storage layer 115 when requests are made at the operating system layer 103. In one embodiment, the GSI 113 may employ custom algorithms to interface between nodes 101, operating systems on nodes 101 (from operating system layer 103), and the storage layer 115.

The GSI 113 may further rebalance all the nodes 101 within a cluster and/or operating system layer 103. For example, the GSI 113 may determine a logical structure command from nodes 101 and check for storage extents in the storage layer 115. In one embodiment, the GSI 113 may further perform the logical structure-related operation (or operation that warranted the logical structure command) at the storage layer 115. Afterwards, the GSI 113, may rebalance all the nodes 101 with metadata associated with operation completion. For example, GSI 113 may evaluate distribution and/or availability of storage space on databases at nodes 101 and distribute the most recent metadata from operation completion accordingly.

In one embodiment, the storage layer 115 may contain storage 117. In one embodiment, the storage layer 115 may manage the storage 117, meaning storage layer 115 may remove or add storage 117. In one embodiment, the storage layer 115 may comprise storage 117 in groups. For example, storage 117*a* may exist independently on storage layer 115 while storage 117*b*-117*n* may be part of a storage group. The groupings in storage layer 115 may affect execution of custom algorithms at the GSI 113.

The data network 109 can interact with one or more networks, such as a telephony network 105, a wireless network 107, and/or a service provider network 111. The service provider network 111 can include at least one application provides services to the service provider network 111. In one embodiment, user transactions or requests for database operations may arrive through the service provider network 111. Additional services associated with, for example, the telephony network 105, the wireless network 107, or the data network 109, may also interact with the operating system layer 103, GSI 113, and storage layer 115. By way of example, a service associated with the data network 109 can store information to files associated with an application of the service provider network 111. In one embodiment, the storage layer 115 may communicate through the data network 109, where applications from the service provider network 111 may collect and store information associated with nodes 101. Then, the applications in the service provider network 111 may provide for the nodes 101 to receive the stored information from storage layer 115.

For illustrative purposes, the networks 105-111 may be any suitable wireline and/or wireless network, and be managed by one or more service providers. For example, telephony network 105 may include a circuit-switched network, such as the public switched telephone network (PSTN), an integrated services digital network (ISDN), a private branch exchange (PBX), or other like network. Wireless network 107 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-111 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions.

According to exemplary embodiments, end user devices may be utilized to communicate over system 100 and may include any customer premise equipment (CPE) capable of sending and/or receiving information over one or more of networks 105-111. (Nodes 101 may include end user devices.) For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc.

Figure 2A:
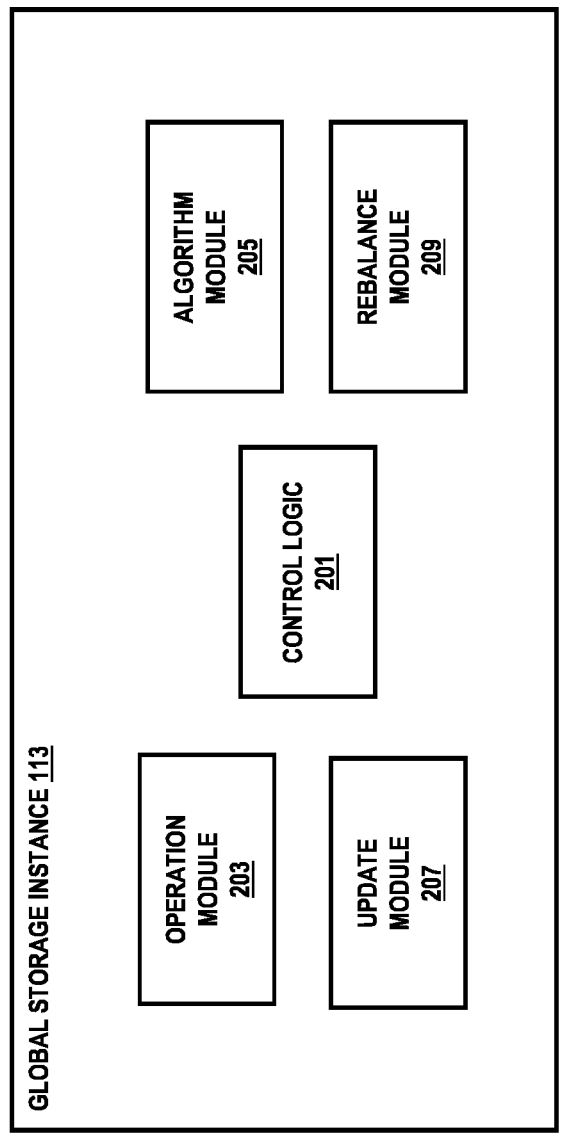
FIG. 2A is a diagram of a global storage instance capable of providing a global repository where metadata is delocalized from storage nodes, according to an exemplary embodiment.

FIG. 2A is a diagram 200 of a global storage instance capable of providing a global repository where metadata is delocalized from storage nodes, according to one embodiment. GSI 113 may comprise computing hardware (such as described with respect to FIG. 11), as well as include one or more components configured to execute the processes described herein for providing the processing services of system 100. In one implementation, the GSI 113 contains control logic 201 an operation module 203, an algorithm module 205, an update module 207, and a rebalance module 209. The control logic 201 performs control logic functions and facilitates coordination among the other components of GSI 113.

In one embodiment, the control logic 201 and operation module 203 may receive a database operation request from an operating system layer. For instance, the operation system layer may include the operating system layer 103 with nodes 101. As previously discussed, the nodes 101 may receive requests for transactions from users and/or other nodes. In one embodiment, the control logic 201 and operation module 203 may create a global storage instance by communicating with a plurality of storage nodes out of the nodes 101 and determining metadata associated with the plurality of storage nodes. For example, the control logic 201 and operation module 203 may determine a plurality of storage nodes and determine metadata associated with the plurality of storage nodes. Then, the control logic 201 and operation module 203 may set up a global storage instance such that the global storage instance contains the metadata for a storage layer where the plurality of storage nodes reside. In one embodiment, the global storage instance may be delocalized from the plurality of storage nodes so that metadata within the global storage instance may not be specific to a particular node 101a. For instance, the control logic 201 and operation module 203 may manage metadata within the GSI 113 such that the GSI 113 may contain metadata associated with multiple nodes 101a-101k.

In a further embodiment, the control logic 201 and operation module 203 may receive a database operation request from an operating system layer, where the request arrives from a local storage instance. For example, the GSI 113 may operate in a master-slave model with local storage instances at each node 101. In such a case, the GSI 113 may determine the nodes 101 and associated local storage instances with which it may communicate in order to determine requests from the local storage instances and locate other local storage instances that may aid in responding to the requests. Furthermore, the GSI 113 may communicate with the local storage instances to update its metadata after completion of the requested database operation.

In one embodiment, the control logic 201 and algorithm module 205 may determine custom algorithms necessary to communicate with nodes 101 and various storage 117. For instance, algorithms for communication may be proprietary to certain technological stacks. The control logic 201 and algorithm module 205 may evaluate database operation requests and determine proper nodes 101 to carry out the operation, as well as the storage 117 that need to be accessed for file objects in completing the operation. After determining the nature of the database operation requests and communication required of the requests, the control logic 201 and algorithm module 205 may select or employ the relevant custom algorithms to coordinate traffic between the operating system layer 103 and storage layer 115.

In one embodiment, the control logic 201 and update module 207 may determine completed database operations and update metadata in the GSI 113 based on the completed operations. Furthermore, the control logic 201 and update module 207 may update storage instances local to nodes 101, where the control logic 201 and update module 207 may update, for example, metadata for a file from an operation. Likewise, the control logic 201 and update module 207 may further update a storage level extent that stores a storage block, for example, on a local disk of a server. In other words, the control logic 201 and update module 207 may update a storage block in the storage layer 115 based on a transaction completed using a file in the storage layer 115, and also update metadata associated with the file at a local storage instance on a node 101 that may access the block at storage layer 115. As previously discussed, the GSI 113 may also update its own metadata repository so that the GSI 113 in some cases may access the block at storage layer 115 without going through a local storage instance.

In one embodiment, the control logic 201 and rebalance module 209 may determine storage extents for all the nodes 101 in a cluster (e.g. nodes 101 at operating system layer 103). For example, the control logic 201 and rebalance module 209 may take inventory of nodes 101 and associated local storage instances at each of the nodes 101. Then, the control logic 201 and rebalance module 209 may update the local metadata at the local storage instances to account for a completed transaction. Furthermore, the control logic 201 and rebalance module 209 may perform a logical structure-related operation at the storage layer 115. For example, the control logic 201 and rebalance module 209 may determine where a command to create a logical structure is issued at the operating system layer 103 and then prompt one or more components for storage 117a-117n to create the logical structure. In one embodiment, the control logic 201 and rebalance module 209 may communicate with storage 117a-117n remote from nodes 101 or add and remove storage 117 to accommodate requests at the operating system layer 103.

Figure 2B:
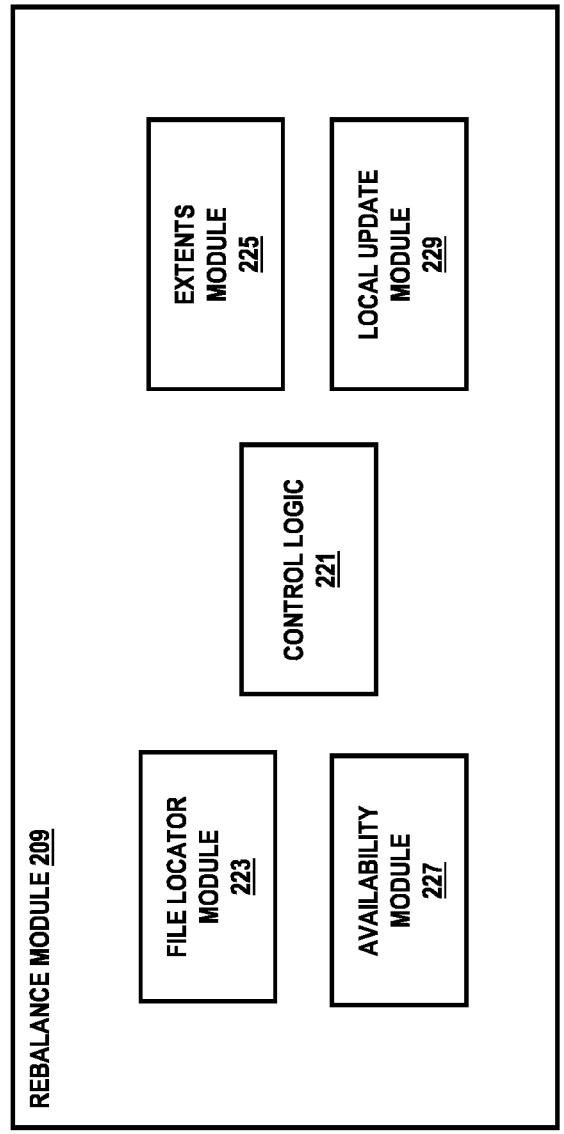
FIG. 2B is a diagram of a rebalance module capable of allocating storage space for a cluster of nodes, according to an exemplary embodiment.

FIG. 2B is a diagram 220 of a rebalance module capable of allocating storage space for a cluster of nodes, according to one embodiment. Rebalance module 209 may comprise computing hardware (such as described with respect to FIG. 11), as well as include one or more components configured to execute the processes described herein for providing the processing services of system 100. In one implementation, the rebalance module 209 contains control logic 221, a file locator module 223, an extents module 225, availability module 227, and local update module 229. The control logic 221 performs control logic functions and facilitates coordination among the other components of rebalance module 209.

In one embodiment, the control logic 221 and file locator module 223 may receive a logical structure command from one of the nodes 101. In one instance, the logical structure command may come, more specifically, from a local storage instance on one of the nodes 101. Then, the control logic 221 may recognize a command as a logical structure command and work with file locator module 223 to check for information regarding location of a file associated with the command. For instance, the control logic 221 and file locator module 223 may check local storage instances for information associated with finding a file object within the storage layer 115.

Then, the control logic 221 and extents module 225 may look for storage extents in the storage layer 115 or clusters of storage 117. For instance, control logic 221 and extents module 225 may recognize that certain commands should be directed to particular cluster of storage 117. In another case, control logic 221 and extents module 225 may check for storage contents in the entire storage layer 115. In one embodiment, the control logic 221 and extents module 225 may determine from control logic 201 that the operation requested by the logical structure command is complete.

Once the operation is complete, the control logic 221 and availability module 227 may determine the availability of storage space in nodes 101 and storage 117. For example, the control logic 221 and availability module 227 may determine where some existing space is underutilized and route data storage to that space, rather than prompting addition of storage space. In another embodiment, the control logic 221 and availability module 227 may determine that a particular system has too much space. Then, the control logic 221 and availability module 227 may permit another system to access the space, and/or remove the space. In a more focused case, the control logic 221 and availability module 227 may simply determine if storage is sufficient for an operation.

In one embodiment, the control logic 221 and local update module 229 may update metadata and local metadata to account for the operation completion and possible rebalancing done by the control logic 221 and availability module 227. For example, actions performed by the control logic 221 and availability module 227 may mean that new directories must be created for new storage paths. The control logic 221 and local update module 229 may recognize and/or create metadata at both (or either) nodes 101 and/or the GSI 113. For example, the control logic 221 and local update module 229 may have a set of metadata for the operation completion local to respective nodes 101 and another set of metadata for the GSI 113.

Figure 3A:
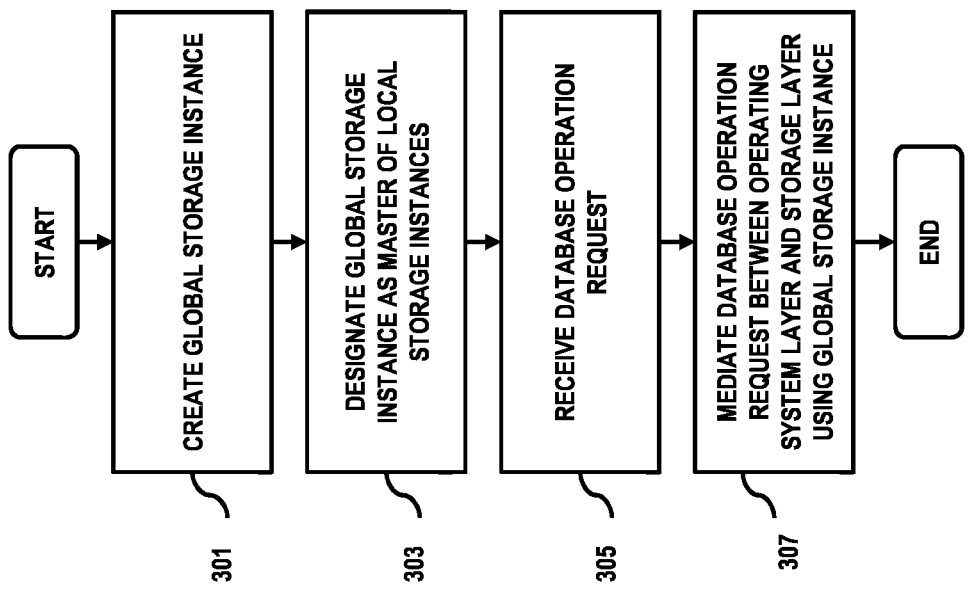
FIG. 3A is a flowchart of providing unified technological stack management (e.g., a global storage instance) where metadata is delocalized from storage nodes, according to an exemplary embodiment.

FIG. 3A is a flowchart 300 of providing unified technological stack management (e.g., via a global storage instance) where metadata is delocalized from storage nodes, according to one embodiment. In step 301, the control logic 201 may create a global storage instance wherein the global storage instance contains metadata for a storage layer including a plurality of storage nodes, and wherein the global storage instance is delocalized from the plurality of storage nodes. In one embodiment, the process of flowchart 300 may further include designating the global storage instance as a master of one or more local storage instances associated respectively with the plurality of storage nodes (step 303). For instance, local storage instances may reside of nodes 101 along with databases at the nodes for storage. The control logic 201 may configure the global storage instance created in step 301 such that the global storage instance receives requests from local storage instances, then updates local metadata at local storage instances after completion of the request. In this way, the global storage instance may act as a master to slave local storage instances.

In one embodiment, the control logic 201 may receive a database operation request from an operating system layer (step 305). For example, nodes 101 may reside on an operating system layer. In the case where a global storage instance acts without being part of a master-slave set-up, the global storage instance may communicate directly with databases at storage nodes (e.g., nodes 101). Where a global storage instance acts as a master, however, the global storage instance may receive the request from local storage instances at the operating system layer. In one embodiment, the control logic 201 may mediate the database operation request between the operating system layer and the storage layer using the global storage instance (step 307). The details of mediating the database operation request are part of the flowcharts that follow. In one embodiment, the storage layer spans a plurality of data centers, a plurality of geographic locations, or a combination thereof.

Figure 3B:
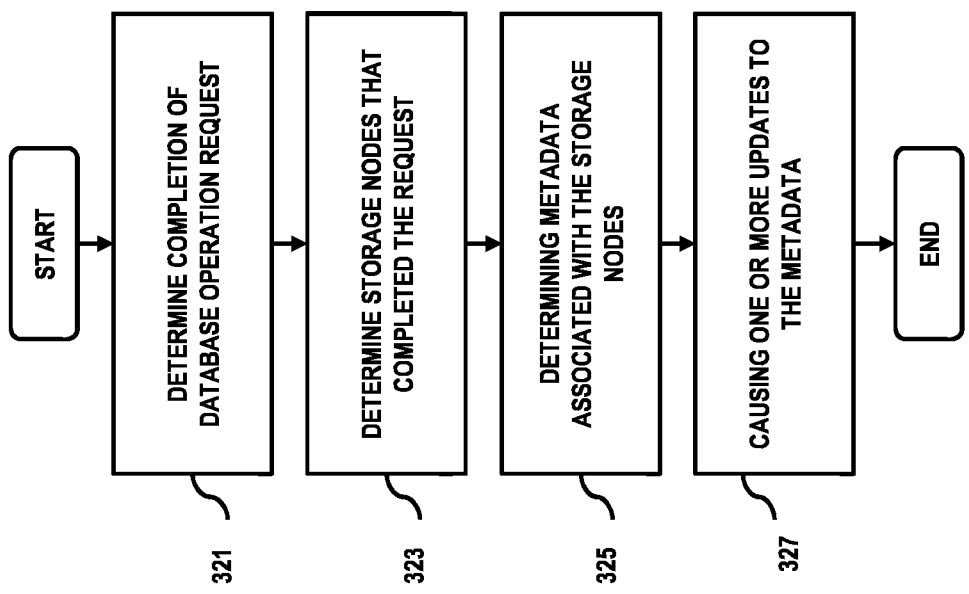
FIG. 3B is a flowchart of mediating the database operation request between the operating system layer and the storage layer using the global storage instance, according to an exemplary embodiment.

FIG. 3B is a flowchart 320 of mediating the database operation request between the operating system layer and the storage layer using the global storage instance, according to one embodiment. In one embodiment, the control logic 201 may determine completion of the database operation request (step 321). For instance, the control logic 201 may determine from nodes 101 that the operation requested has been completed successfully. Then, the control logic 201 may determine one or more storage nodes that completed the database operation request (step 323). For example, the control logic 201 may determine nodes 101 and corresponding nodes 101 associated with file objects used in performing the requested database operation. Then, the control logic 201 may cause one or more updates to the metadata based on metadata associated with the one or more storage nodes (step 325 and step 327).

Figure 3C:
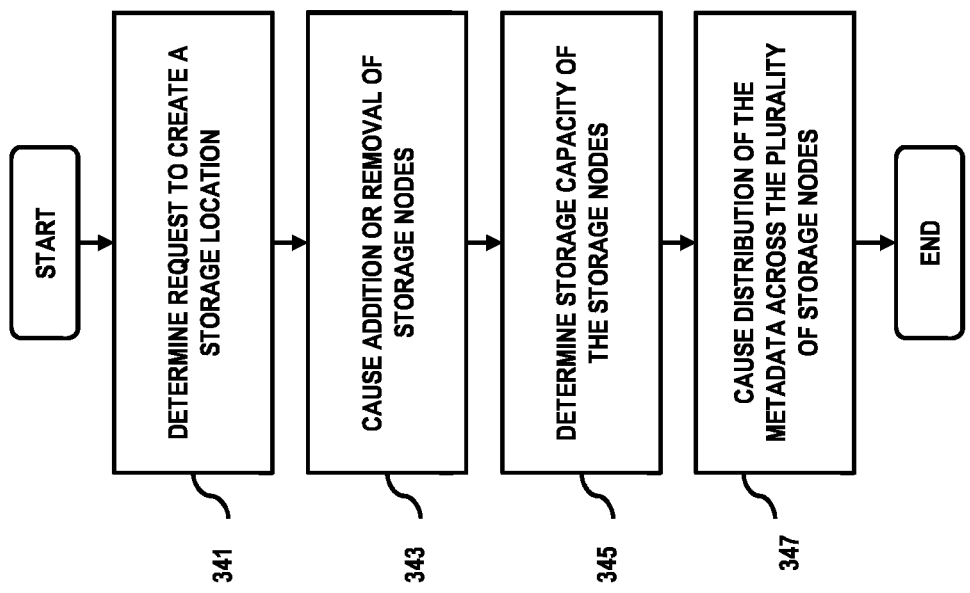
FIG. 3C is a flowchart of rebalancing storage nodes, according to an exemplary embodiment.

FIG. 3C is a flowchart 340 of rebalancing storage nodes, according to one embodiment. In one embodiment, the control logic 201 may determine a request to create a storage location (step 341). For example, the control logic 201 may receive a command related to a logical structure. Then, the control logic 201 may locate nodes 101 at which to create the logical structure. In one embodiment, the control logic 201 may further cause an addition or removal of one or more storage nodes based on the request (step 343). In one embodiment, the control logic 201 may then determine storage capacity of the plurality of storage nodes and cause a distribution of the metadata across the plurality of storage nodes (step 345 and step 347). In one embodiment, the control logic 201 may cause the distribution wherein the distribution of the metadata is based on the storage capacity of the plurality of storage nodes. In one embodiment, the control logic 201 may further determine one or more storage configurations related to the storage capacity of the plurality of storage nodes, wherein the distribution of the metadata is based on the one or more storage configurations. For example, the storage nodes and/or global storage instance may have configurable settings. Functions and/or settings at the operating system level 103 may be set to govern storage and usage of the global storage instance in conjunction with storage nodes and the storage layer 115.

Figure 4:
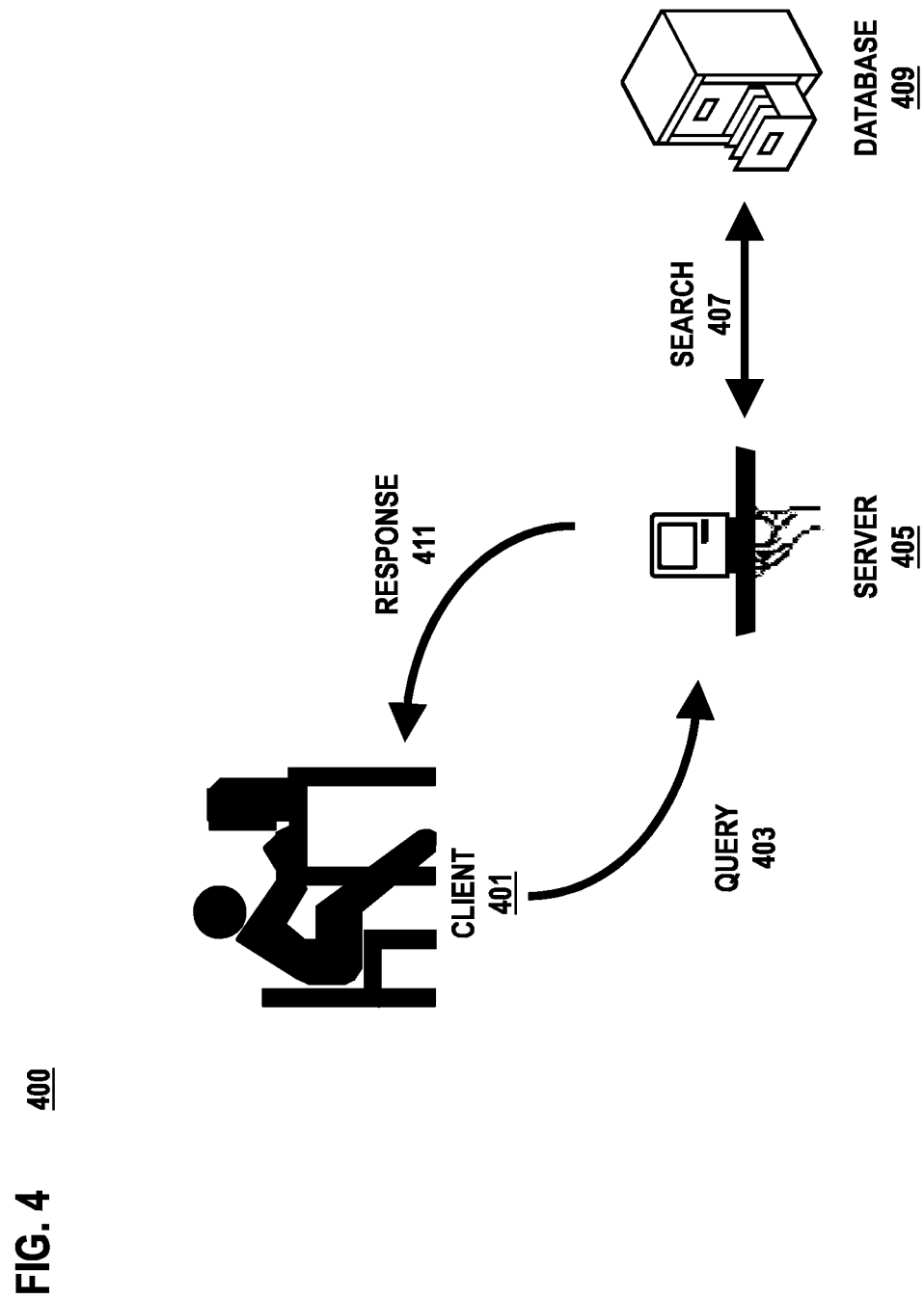
FIG. 4 is a model showing the traditional, client server model for RDBMS architecture, according to an exemplary embodiment.

FIG. 4 is a model 400 showing the traditional, client server model for RDBMS architecture, according to one embodiment. For example, a client 401 may initiate a transaction, meaning that a query 403 may be received by an application server 405. Application server 405 may generate a SQL query and prompt a search 407 at a database 409. The database 409 would then process the query. For instance, a database engine of database 409 may retrieve the result set for the query and pass the results back to the application server 405. Then, the application server 405 may pass the result or response 411 to the client 401.

FIG. 5 is a model 500 where logical or memory components of a database are split from application servers, in one embodiment. In the initial client server model of model 400, application servers contained logical or memory components of a database. The SQL query was generated directly at the application servers. However, model 500 shows application servers and logical components as separate entities. For example, application servers 501 may exist at one layer and database servers and logical components 503 may exist in an independent layer. Then, the application servers 501 and database servers and logical components 503 may work in conjunction to contact the shared storage system 505. For instance, application servers 501 may receive a request for a transaction, the database servers and logical components 503 may create the SQL query, and the application servers 501 and/or the database servers and logical components 503 may pass the SQL query to the shared storage system 505. In separating the database servers and logical components 503 from the application servers 501, model 500 clusters the logical components. In doing so, model 500 permits processes to run on multiple servers. Since memory structures can then run on multiple machines within the shared storage system 505, even if one of the application servers 501 was unavailable, other application servers could complete the action. Once one of the servers becomes available, it is able to synchronize its information with other servers and continue acting as part of the cluster.

Figure 6A:
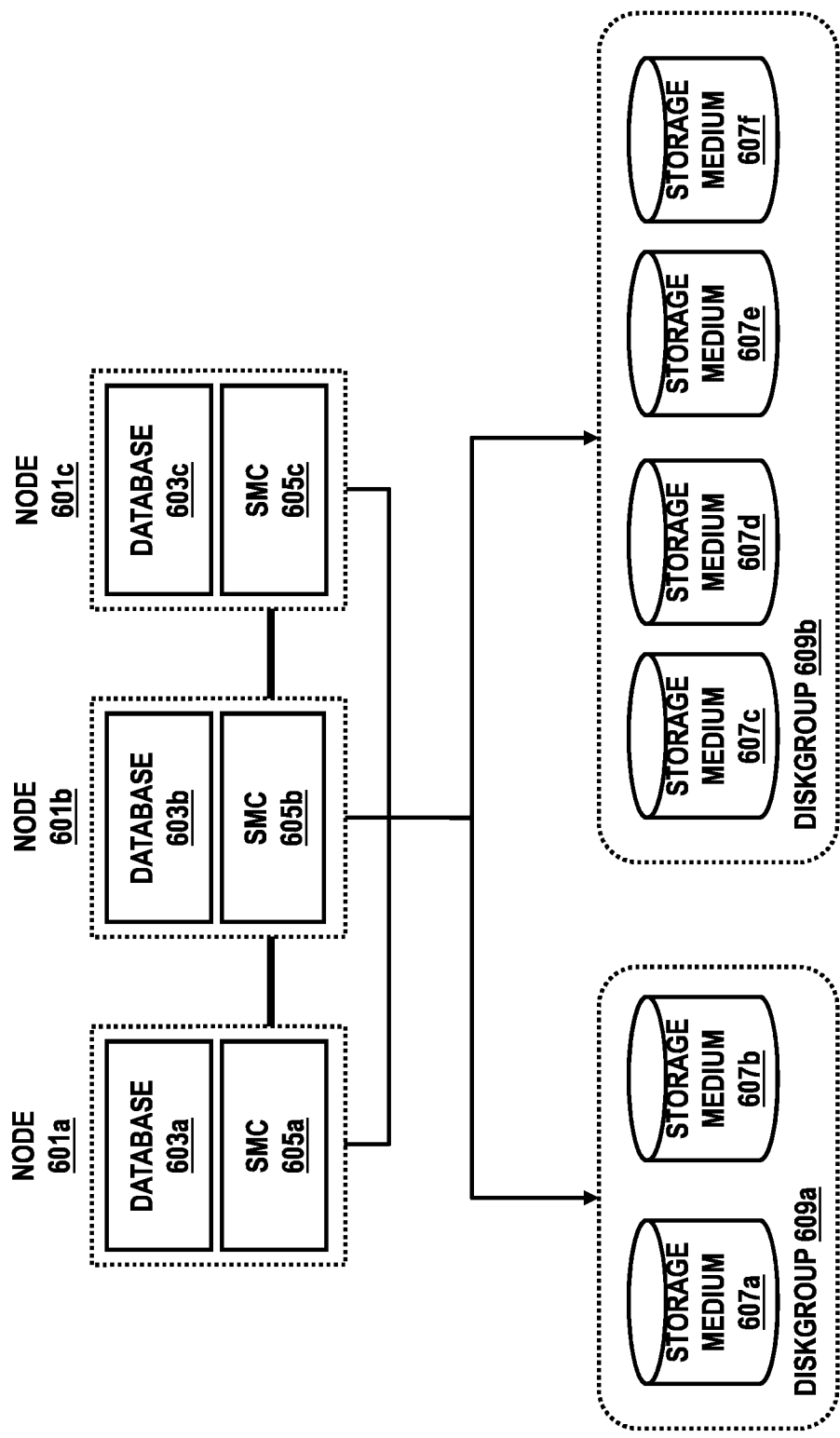
FIG. 6A is a model showing storage instance clustering, according to an exemplary embodiment.

FIG. 6A is a model 600 showing storage instance clustering, according to one embodiment. Model 600 is a development from model 500 in that model 600 releases nodes from dependence on shared storage within a single data center. Model 600 achieves this by enabling communication between each node and its operating system, then capturing operating system-related metadata and communicating with storage using the metadata. In other words, model 600 has components devoted specifically to capturing operating-system metadata. For example, several nodes 601a-601c (or nodes 601) may exist, where each database and storage management component (SMC) exists at each node. For instance, node 601a may comprise database 603a and storage management component 605a. In one embodiment, storage management components 605a-605c (or storage management components 605) may comprise algorithms and metadata to manage files. For example, the metadata may contain information to locate file objects. Algorithms may employ metadata to find files at file object locations at storage mediums 607a-607f. For example, the algorithms may collect and group metadata to determine a given storage medium 607a where collected metadata is grouped. To retrieve file objects, algorithms may identify files required for a transaction, determine metadata to locate the files in storage, and fetch the file objects. Algorithms may further manage or organize metadata, determining metadata that may be associated with each of the nodes 601. In one embodiment, storage management components 605 may manage file systems and volumes of respective databases 603 and direct SQL statements to proper files. In one embodiment, storage mediums 607a-607f (or storage mediums 607) may contain the actual files. In one instance, the storage mediums 607 may be organized into diskgroups 609a and 609b (or diskgroups 609). Diskgroups 609 may be organized around types of storage mediums 607, for example, storage mediums 607 that share the same configurations. Diskgroups 609 may be any number of storage mediums 607 that may be controlled as one unit.

In one embodiment, the storage management components 605 may create extents for SQL statements at nodes 601. Extents may comprise units of storage in the storage management components 605 that are allocated for reserved for files and data. In one instance, the smallest units of storage space in storage management components 605 are data blocks. Extents comprise a set number of continuous data blocks reserved for storing the SQL statements. In creating extents, the storage management components 605 may first create an initial extent made up of the set number of continuous data blocks. If the initial extent is full, new extents may be created. These subsequent extents may be of a same size or larger size than the initial extent. Then, the storage management components 605 may distribute the extents across storage mediums 607 in a given diskgroup 609. In one embodiment, the storage management components 605 may create and/or remove storage mediums 607 within diskgroups 609 or move data between storage mediums 607 within diskgroups 609. Creating storage mediums 607 may be desired when more storage is necessary and/or when storage medium failure is detected and storage mediums 607 have to be replaced. To create storage mediums 607, users may configure storage mediums 607 by specifying values for parameters that dictate how to access, efficiently store, and locate data within the storage mediums 607. To replace storage mediums 607, a given storage medium 607 may be detached from diskgroup 609a, then replaced with a new disk. In one instance, removal of a storage medium 607 may be desirable to delete unused disks that do not have subdisks. In one example, removing a storage medium 607 from a diskgroup 609 may involve disabling the diskgoup 609 and consolidating, for instance, portions of the storage medium 607a onto another storage medium 607b then removing the original storage medium 607a. In another instance, removal may be performed by copying the data on the storage mediums 607 (to back it up), then reconfiguring the number of storage mediums 607 within a given diskgroup 609. As shown in FIG. 6A, model 600 is comprised, for example, of two layers: a layer of nodes 601 communicating with a layer of storage, diskgroups 609.

Figure 6B:
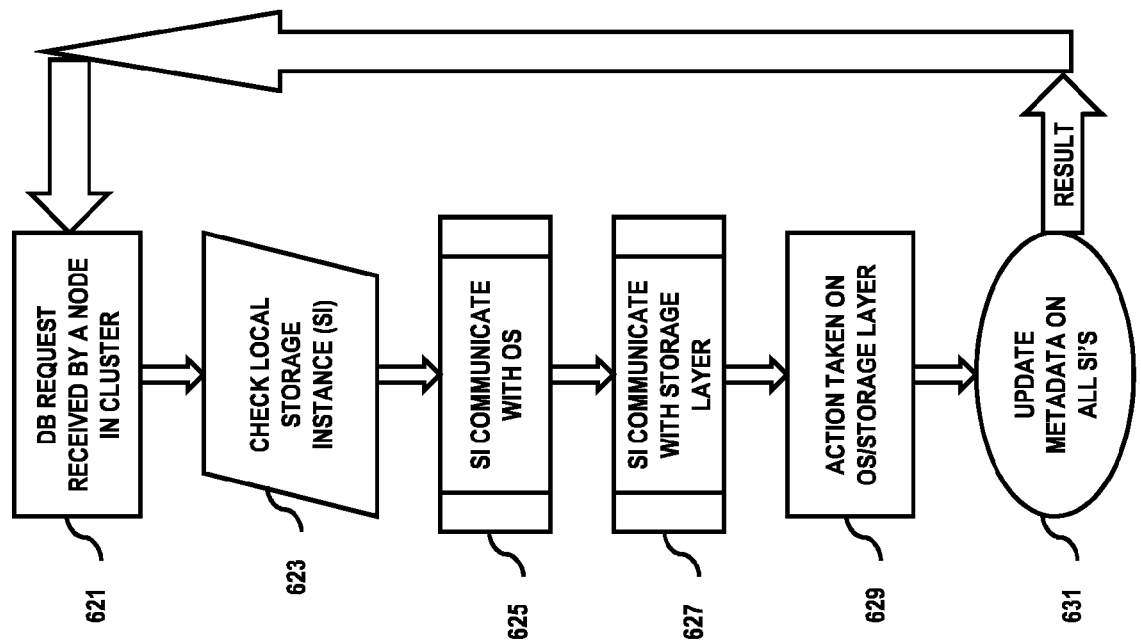
FIG. 6B is a flowchart of a communication amongst the layers in model 600, according to an exemplary embodiment.

FIG. 6B is a flowchart 620 of a communication amongst the layers in model 600, according to one embodiment. For example, the nodes 601 may receive a database request at step 621. This means that a local storage instance (SI) located on a particular node 601 may receive the database request (step 623). In one scenario, the storage management components 605 at each node may be a local storage instance. In other words, the SI is local to each node 601 in a cluster, where the SI may manage communication for the node, with diskgroups 609. After receiving the database request, the SI may carry out step 625 by communicating with an operating system, for instance, in conjunction with respective databases 603. In communicating with the operating system, the SI may determine an action to be performed using the diskgroups 609, depending on the nature of the request. With this action, the SI may communicate with the diskgroups 609, which may comprise a storage layer (step 627). The communication may cause completion of the action (step 629), at which point, the SIs may update the metadata across all the nodes 601 and (local) SIs in a cluster of nodes 601 (step 631). This way, all of the SIs in a cluster of nodes 601 are synchronized.

The nodes are synchronized so that corresponding nodes are aware of file indexes of nodes within a cluster, and metadata of associated nodes can be managed collectively. However, because metadata is local to each node, model 600 still encounters issues in scaling beyond a data center. Nodes 601 must be in close vicinity to each other and connected via high speed to have the latest information coordinated amongst the nodes 601. Latency is an issue if nodes 601 are not proximate each other since there would be lags in both communication amongst nodes 601, and between nodes 601 and diskgroups 609.

Figure 7A:
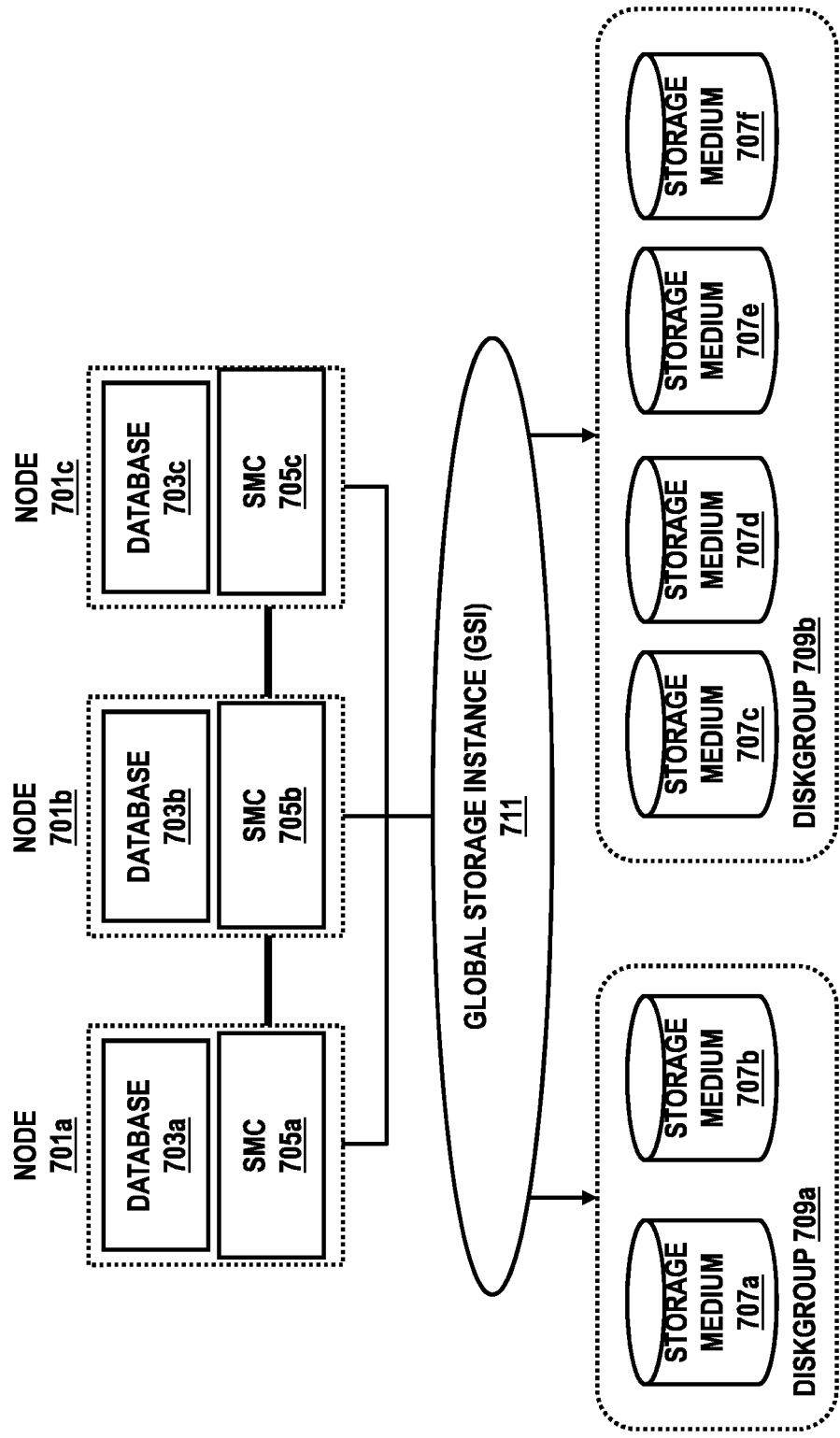
FIG. 7A is a model showing use of a global storage instance (GSI), according to an exemplary embodiment.

FIG. 7A is a model 700 showing use of a global storage instance (GSI), according to one embodiment. In one embodiment, model 700 is analogous to GSI 113 of system 100 in FIG. 1. Like model 600, model 700 may contain several nodes 701a-701c (or nodes 701), each with respective databases 703a-703c (or databases 703) and storage management components 705a-705c (or storage management components 705). Also like model 600, model 700 may have a storage layer with storage mediums 707a-707f (or storage mediums 707) organized into diskgroups 709a and 709b (or diskgroups 709). However, model 700 includes GSI 711. In one embodiment, GSI 711 contains metadata for all the nodes 701. For example, metadata may include information for locating nodes, finding file content, storage extents of records, and/or database pointers. In other words, the metadata contained in GSI 711 may be any information necessary to locate and retrieve file content from nodes. In one instance, GSI 711 may simply perform the function of storage management components 705. In another instance, GSI 711 may operate in a master-slave model with the storage management components 705, where the GSI conducts the communication between the nodes 701 and diskgroups 709 by identifying which storage management components 705 to contact and being the initiator to direct commands to update and/or synchronize metadata to the storage management components 705. For example, based on metadata in GSI 711, the GSI 711 may determine that file content resides on a particular storage management component 705.

Figure 7B:
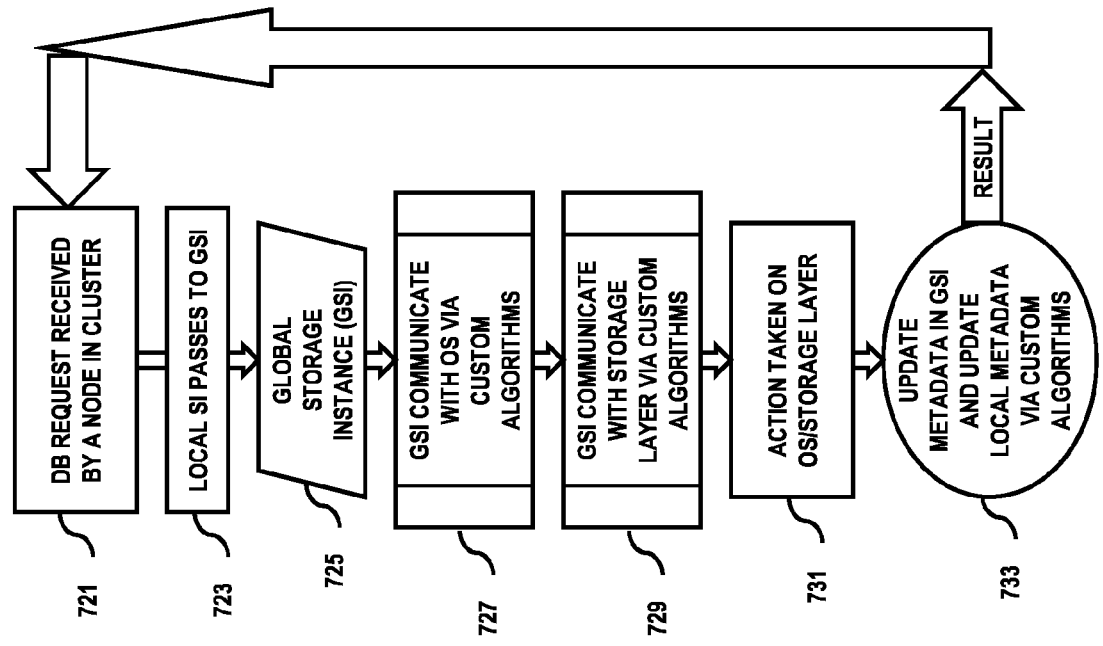
FIG. 7B is a flowchart of a communication amongst the layers in model 700, according to an exemplary embodiment.

FIG. 7B is a flowchart 720 of a communication amongst the layers in model 700, according to one embodiment. For example, step 721 may include nodes 701 may receive a database request. Then, an SI (e.g., a storage management component 705 at a node) may pass the request to GSI 711 (step 723). The GSI 711 may evaluate the request (step 725) and then communicate with the operating system via custom algorithms (step 727). For instance, the GSI 711 may use custom algorithms specific to interfacing with particular nodes 701 and/or versions of operating systems existing on the particular nodes 701. Custom algorithms may include any set of heuristics and/or calculations that permits the GSI 711 to communicate with nodes 701. For example, the custom algorithms may convert communications to a common medium that can be read by both GSI 711 and/or nodes 701. The custom algorithms may take into account respective specifications and communications means of GSI 711 and nodes 701, then form a set of rules that can permit interaction between the GSI 711 and nodes 701.

After ascertaining the action requested, the GSI 711 may communicate with the storage layer (e.g., diskgroups 709), also via custom algorithms (step 729). In one embodiment, the GSI 711 may note the completion of the action with step 731, then update metadata. For example, the GSI 711 may note completion through a permanent change to the storage layer. Failure to complete the action may manifest as a return of the storage layer to a prior state. Permanent change to the storage layer is shown in a visible indication of the transaction in all the resources engaged by the transaction. The change shown through all the resources may affect metadata used to locate those resources in storage or that are part of the storage layer. In this way, GSI 711 may update metadata at the nodes 701 to reflect the change in the storage layer in order to locate the resources in accordance with the change. With model 700, step 733 of updating metadata may include updating metadata in the GSI 711 and updating metadata at local SIs, for example, via custom algorithms.

FIG. 7C is a flowchart 740 of a communication amongst the layers in model 700 that leads to creation of a storage location, according to one embodiment. In one embodiment, the creation may take place at databases 703 of nodes 701 associated with an action. For example, data is typically in either a database memory (at a node) or on storage mediums. Until an action (or user transaction) is committed, data is held in the database memory. This may be shown with step 741, where a user transaction is initiated. To ensure that a database may be returned to a prior state before the transaction is entirely complete, the system in model 700 may take step 743 of setting a savepoint. Then, data from storage mediums may be held in database memories with step 745, where the data is inserted into a database "A." If the transaction succeeds, a further insert may be made with the data (step 747). In one embodiment, the insert may be at a storage medium within a diskgroup. Here, the second change with the data is denoted as an insert to an entity "B." If that, too, succeeds and the transaction is complete, the transaction is committed (step 749). In one embodiment, once a transaction is committed, a log writer writes log information for the transaction. In some cases, commit is not considered complete until the log information is complete.

In one embodiment, if performing the transaction is unsuccessful at any point, step 751 may occur to rollback to the savepoint set in step 743. In a further embodiment, completion of a transaction may include inserting an error log (step 753). After the commit, databases may update metadata and associated storage level extent. The commit may correspond to metadata updates, both in flowcharts 620 and 720. For instance, the system 100 may recognize where a relevant block for the data is stored. Whenever the block is retrieved or updated, system 100 may check associated metadata and update and/or modify the corresponding block. In one case, a storage block could be located on a storage area network (SAN) or local disk of a server.

Figure 8A:
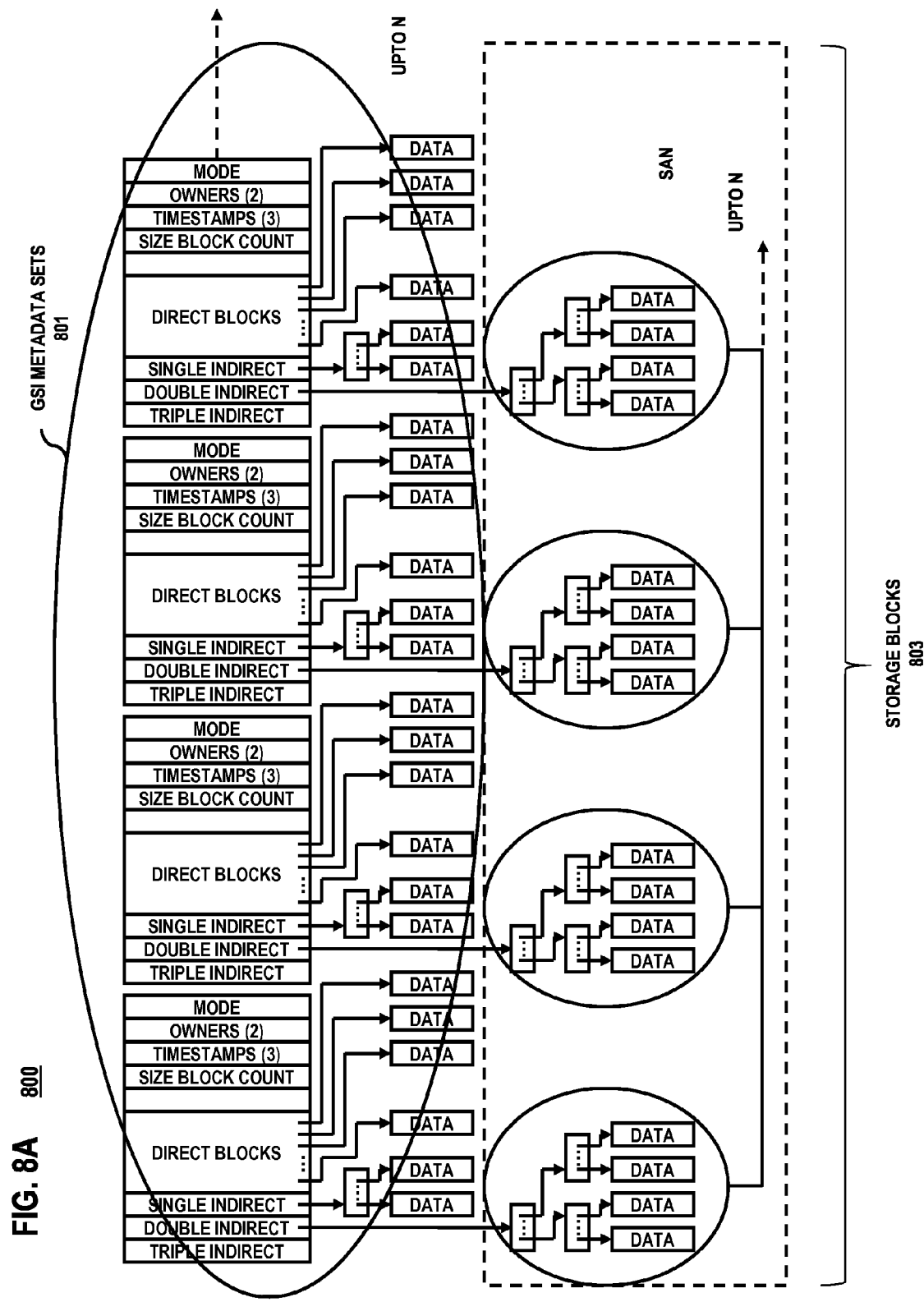
FIG. 8A is a diagram of a global storage instance as a centralized form of managing a technology stack, according to an exemplary embodiment.

FIG. 8A is a diagram 800 of a global storage instance as a centralized form of managing a technology stack, according to one embodiment. In one embodiment, the global storage instance may include multiple metadata sets 801 and blocks 803. Previously with model 600, each node 601a-601c had its own set of metadata and each node 601a-601c managed respective metadata locally. For example, if node 601a received a transaction that resulted in a commit, metadata in database 603a and storage management component 605a would get updated. A commit function ends a transaction, applying the transaction request to a database so that the transaction is recorded in storage. If a storage block associated with the transaction was to be retrieved again, nodes 601 in the cluster would know the location of the block and act accordingly. However, nodes 601 rely on being in close proximity to know which node 601a-601c (and associated database 603a-603c and storage management component 605a-605c) to contact for the block.

By use of the global storage instance of diagram 800, however, the GSI of diagram 800 may store the database and metadata of all the nodes in a cluster (e.g., metadata sets 801), as well as storage blocks 803. Therefore, when a transaction is deemed complete, the GSI of diagram 800 may check for storage management components associated with nodes that executed the transaction. In one embodiment, nodes associated with the transaction may not be local to a cluster. For example, nodes may or may not be within the same data center. Then, metadata is current in the GSI and metadata may permit nodes to interact independently of their geographic locations.

Figure 8B:
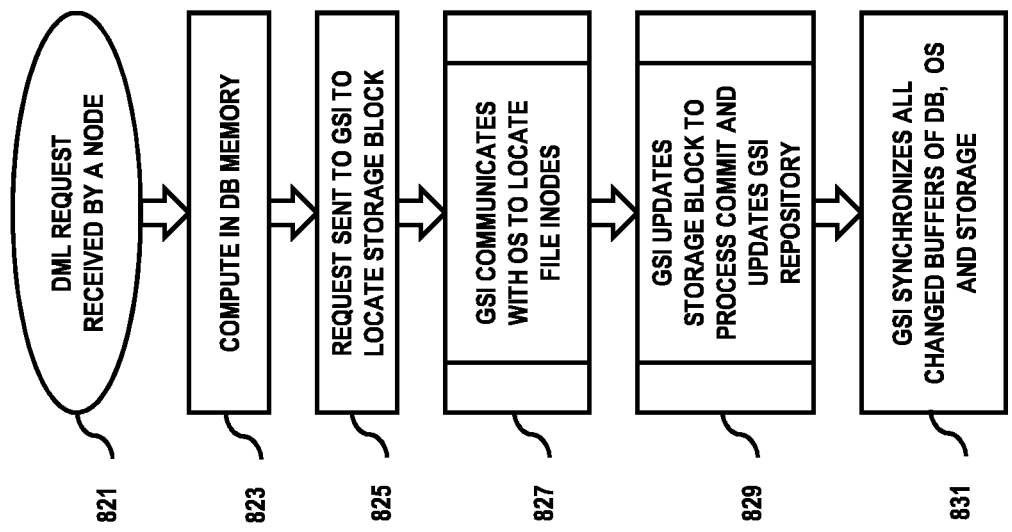
FIG. 8B is a flowchart of a GSI operating as a master instance, with local SIs as slave instances to the GSI, according to an exemplary embodiment.

FIG. 8B is a flowchart 820 of a GSI operating as a master instance, with local SIs as slave instances to the GSI, according to one embodiment. For example, step 821 may include a node receiving a database operation request. An operating system may compute the request at a database memory with step 823 and subsequently send a request to a GSI to locate a local storage block that can perform the request (step 825). Then, the GSI may communicate with the operating system to locate metadata to find file objects for the request (step 827). If the transaction is completed successfully, the GSI may perform step 829 of updating its storage block to process the commit. As a final step, the GSI may synchronize all buffers that are changed as a result of the transaction (step 831). For instance, the GSI may synchronize database buffers, relevant parts of operating systems, and associated storage blocks.

Figure 9A:
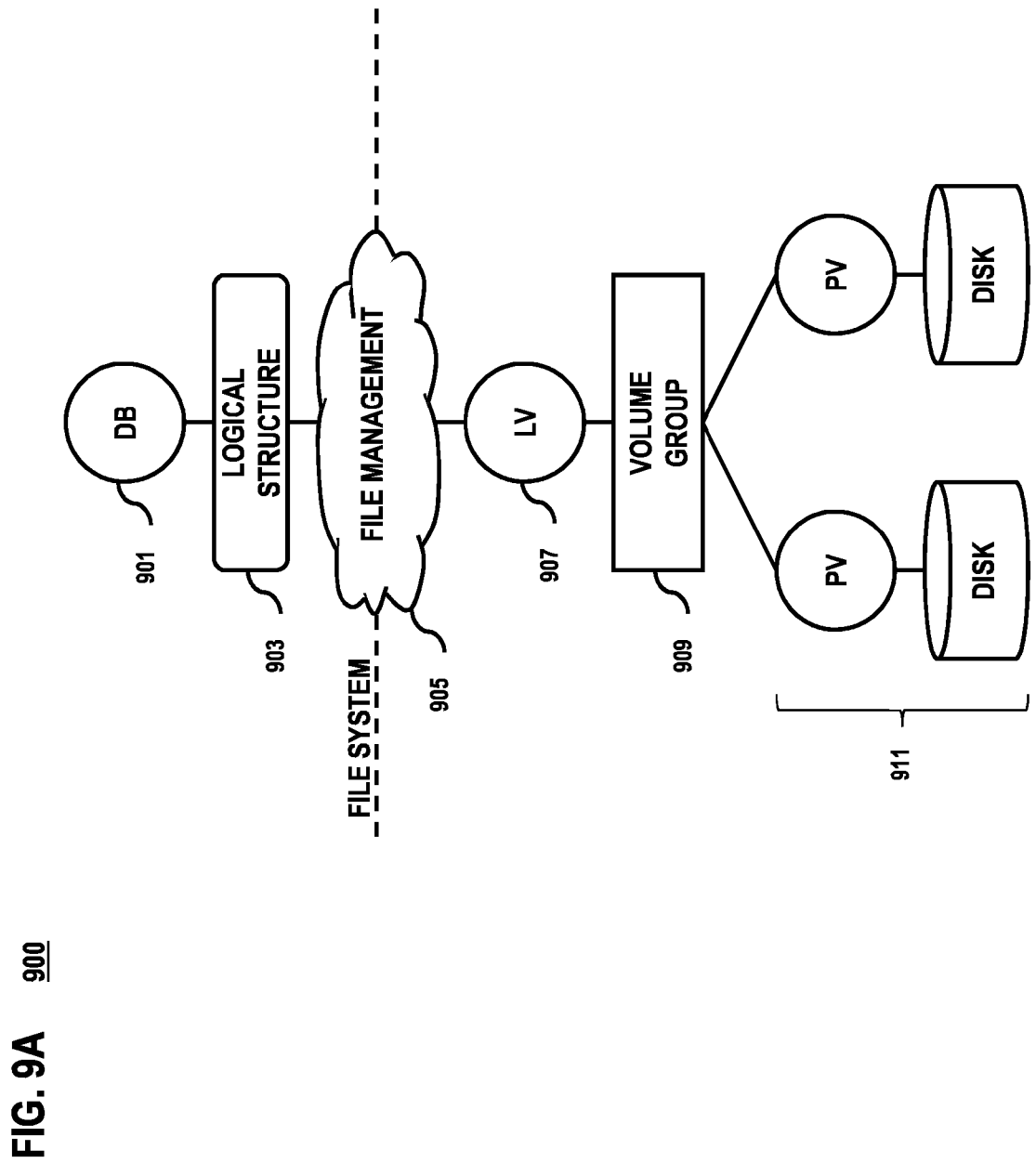
FIG. 9A is a flowchart of a storage management operation that takes place in conjunction with the synchronization and updating discussed above, according to an exemplary embodiment.

FIG. 9A is a flowchart 900 of a storage management operation that takes place in conjunction with the synchronization and updating discussed above, according to one embodiment. Flowchart 900 is one example of single-instance storage management (e.g., model 400). For example, flowchart 900 shows the operation for a database (DB) server running on a single host in a local storage similar to the scenario shown in model 600. Most logical structure management operations comprise of creating, dropping, adding, or resizing a datafile. This operation may take place at all layers of communication within an RDBMS (e.g., database, operating system, and storage levels). For flowchart 900, the database may receive a command related to a logical structure at step 901. Then, the database may check its metadata repository to locate corresponding storage extents (step 903). For example, storage extents may be located on a disk. From there, the database may manage files (step 905). For example, the database may create each datafile as a result of database operations. Then, the database may update metadata associated with datafiles. While file usage and/or management is in flux, the database may employ one or more logical volumes (LV) for the datafile and metadata (step 907). In one embodiment, the steps of flowchart 900 may further include step 909 of contacting a volume group to access physical volumes (PV) at, for example, disks (step 911).

Figure 9B:
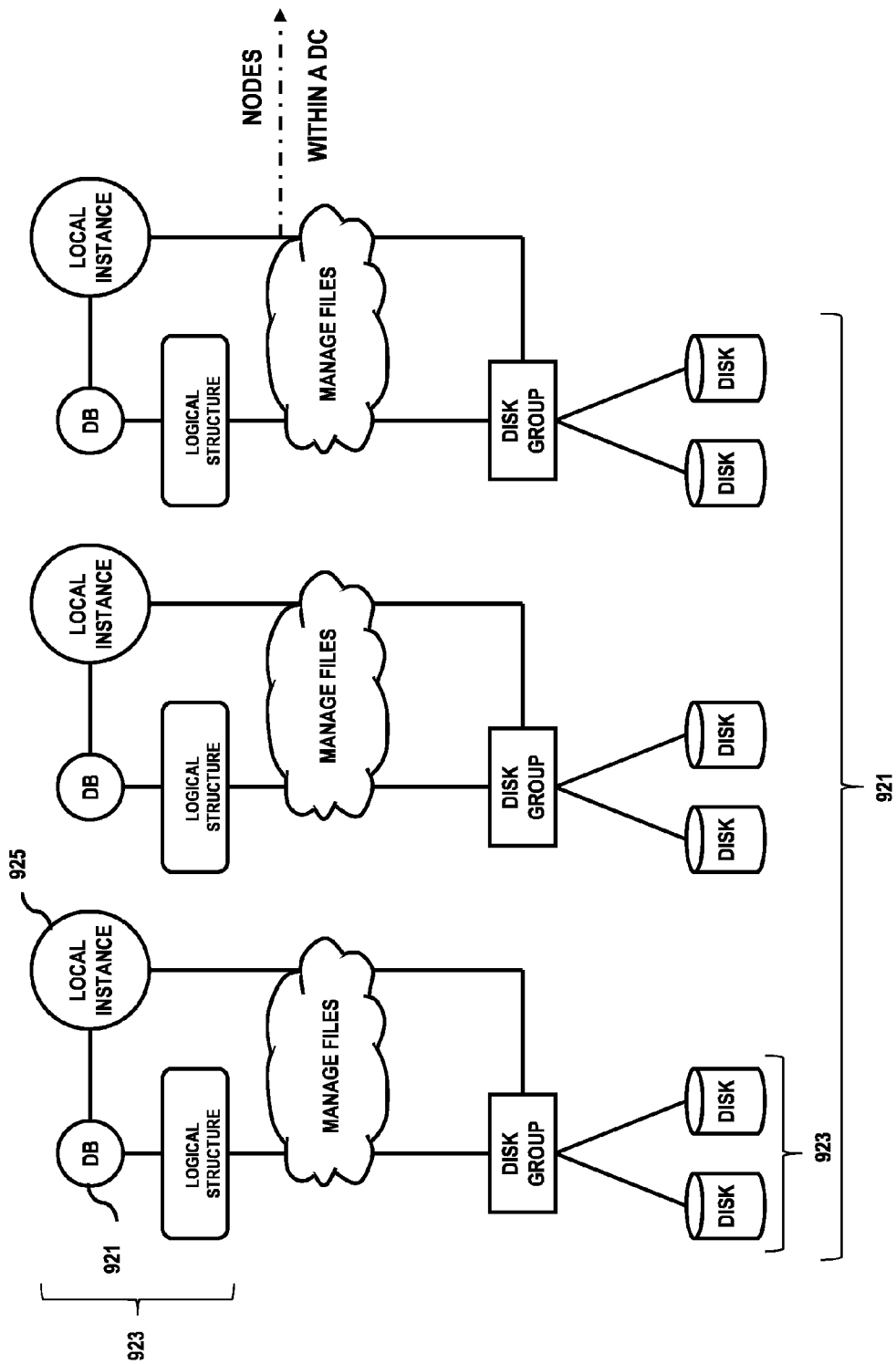
FIG. 9B is a diagram of multi-instance management (e.g., model 600), according to an exemplary embodiment.

FIG. 9B is a diagram 920 of multi-instance management (e.g., model 600), according to one embodiment. For example, a cluster 921 may comprise multiple nodes 923. Local (storage) instances 925 may manage interaction between associated databases, an operating system, and storage. If a logical structure-related command 927 is issued on any node 923 in the cluster 921, a database 929 may check its metadata in conjunction with a local instance 925. The local instance 925 may then communicate with the operating system and check for metadata associated with a particular file involved. Once the metadata is updated, storage operations are performed and the local instance 925 is rebalanced across all the nodes in a given cluster. Since management is local to a server, coordination within the cluster is dependent on a high speed network to keep the rebalancing current. As previously discussed, the coordination also requires geographic proximity between the nodes.

Figure 9C:
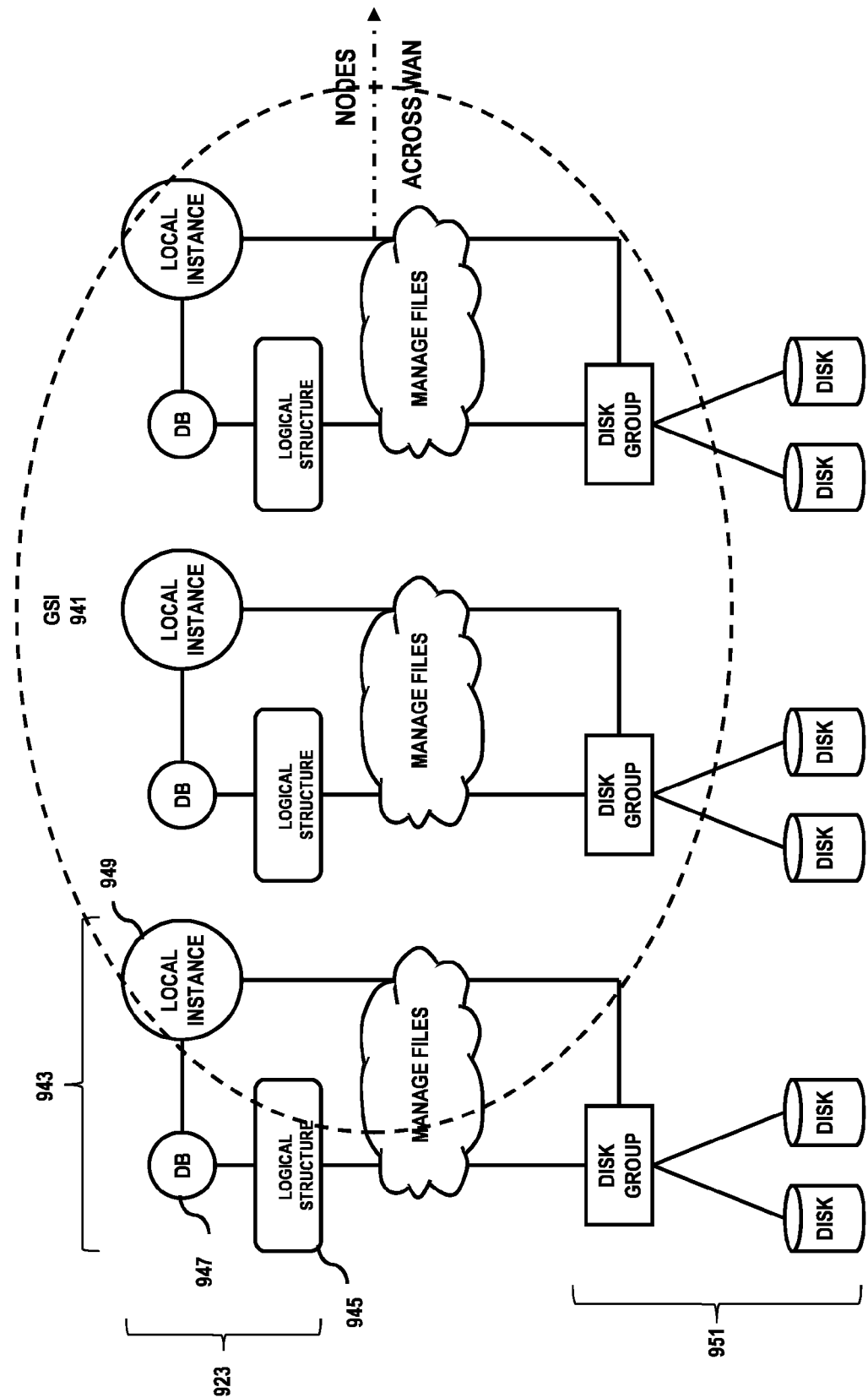
FIG. 9C is a diagram 940 showing use of global instance storage management (e.g., model 700), according to an exemplary embodiment.

FIG. 9C is a diagram 940 showing use of global instance storage management (e.g., model 700), according to one embodiment. In one embodiment, the GSI 941 may oversee all the activity for nodes 943 in a cluster. For example, after a logical structure command 945 is issued on a node 943 and a database 947 on the node checks its metadata with local instance 949. Then, the local instance 949 may check for metadata associated with the requested file and pass the information to the GSI 941. The GSI 941 has the metadata and knows related local instances 949 of the entire technology stack. When the request is passed to the GSI 941, the GSI may check for storage extents for the entire storage cluster 951 and perform a logical structure-related operation at the storage layer. A logical structure-related operation may include a management function that allows creating, tracking, and finding storage extents. Tracking storage extents may further include noting that storage extents are available or making storage extents available. Once the transaction is complete, the GSI 941 may rebalance all the nodes 943 within the cluster and update local instance 949 for local metadata. Rebalancing all the nodes 943 may allow allocation of action execution across various nodes. For instance, rebalancing may permit the nodes 943 to be used equally so means to access to file objects associated with transactions is evenly distributed across all the nodes 943. Updating local instance 949 with local metadata may allow accuracy at local instances 949 when local instances 949 check for metadata associated with requested files before passing information to the GSI 941. In other words, local instances 949 are updated to facilitate the GSI 941 in finding storage extents in the storage cluster 951. In other words, the GSI 941 may act as a master node, holding all the information of metadata for all the nodes 943 within a cluster. In delocalizing the metadata and working in a master-slave model with local instances 949, the GSI 941 may overcome limitations that require clusters to have geographically proximate nodes.

The processes described herein for providing for providing a metadata management framework may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
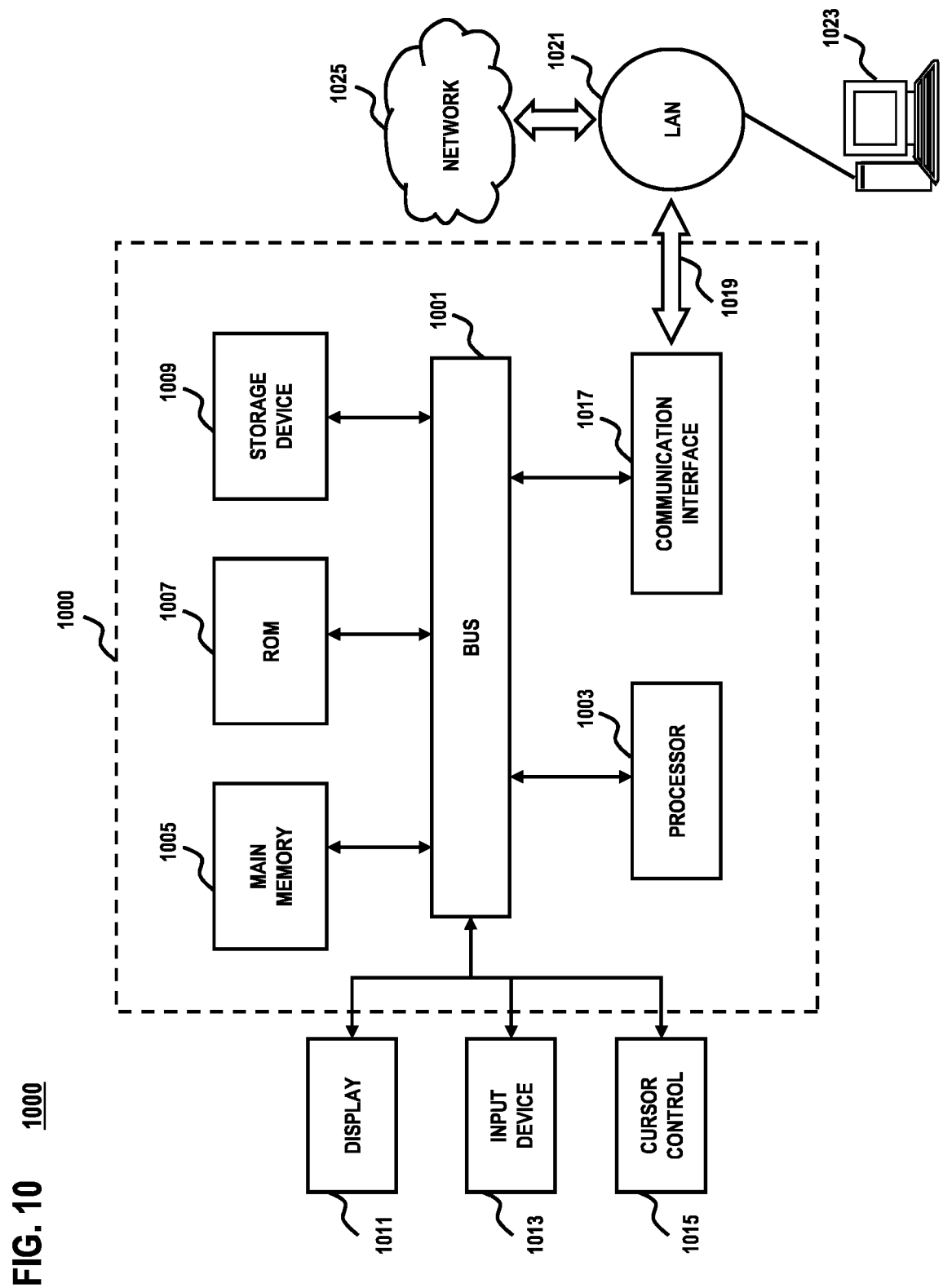
FIG. 10 is a diagram of a computer system that can be used to implement various exemplary embodiments.

FIG. 10 is a diagram of a computer system that can be used to implement various embodiments. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
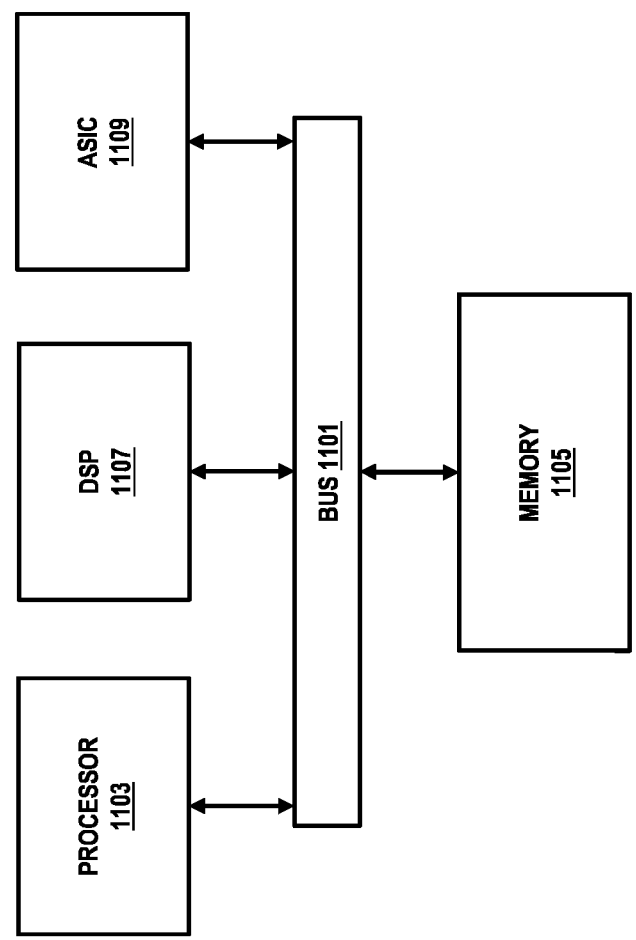
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 4-7.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

What is claimed is:

1. A method comprising:
    creating, by an apparatus operated by a service provider, a global storage instance in response to an end user request, wherein the global storage instance contains metadata of a storage layer including all storage nodes operated by the service provider for a plurality of clients, and wherein the global storage instance is delocalized from the storage nodes, wherein the storage layer includes a plurality of data centers at different geographic locations;
    receiving, by the apparatus, a database operation request from an operating system layer;
    mediating, by the apparatus, the database operation request between the operating system layer and the storage layer using the metadata of the storage nodes contained in the global storage instance; and
    upon a completion of the database operation request, initiating, by the apparatus, (1) updates to the metadata of the storage nodes contained in the global storage instance based on metadata locally updated at one or more of the storage nodes that completed the database operation request, (2) a synchronization of file indexes of all of the storage nodes, and (3) an account for and a rebalance of storage space available in all of the storage nodes.

2. A method of claim 1, further comprising:
    designating the global storage instance as a master of one or more local storage instances associated respectively with the storage nodes,
    wherein the end user request is made by a customer and received via a network node operated by the service provider.

3. A method of claim 1, further comprising:
    determining a request to create a storage location; and
    causing an addition or removal of one or more storage nodes based on the request.

4. A method of claim 3, further comprising:
    causing a distribution of the metadata across the storage nodes.

5. A method of claim 3, further comprising:
    determining storage capacity of the storage nodes,
    wherein the distribution of the metadata is based on the storage capacity of the storage nodes.

6. A method of claim 5, further comprising:
    determining one or more storage configurations related to the storage capacity of the storage nodes; and
    wherein the distribution of the metadata is based on the one or more storage configurations.

7. An apparatus comprising:
    at least one processor; and
    at least one memory including computer program code for one or more programs, the at least one memory and the computer program code configured to, with the at least one processor, cause the apparatus operated by a service provider to perform at least the following,
- create a global storage instance in response to an end user request, wherein the global storage instance contains metadata of a storage layer including all storage nodes operated by the service provider for a plurality of clients, and wherein the global storage instance is delocalized from the storage nodes, wherein the storage layer includes a plurality of data centers at different geographic locations;
- receive a database operation request from an operating system layer;
- mediate the database operation request between the operating system layer and the storage layer using the metadata of the storage nodes contained in the global storage instance; and
- upon a completion of the database operation request, initiate (1) updates to the metadata of the storage nodes contained in the global storage instance based on metadata locally updated at one or more of the storage nodes that completed the database operation request, (2) a synchronization of file indexes of all of the storage nodes, and (3) an account for and a rebalance of storage space available in all of the storage nodes.

8. An apparatus according to claim 7, wherein the apparatus is further caused to:
designate the global storage instance as a master of one or more local storage instances associated respectively with the storage nodes.

9. An apparatus according to claim 7, wherein the apparatus is further caused to:
determine a request to create a storage location; and
cause an addition or removal of one or more storage nodes based on the request.

10. An apparatus according to claim 9, wherein the apparatus is further caused to:
cause a distribution of the metadata across the storage nodes.

11. An apparatus according to claim 9, wherein the apparatus is further caused to:
determine storage capacity of the storage nodes,
wherein the distribution of the metadata is based on the storage capacity of the storage nodes.

12. An apparatus according to claim 11, wherein the apparatus is further caused to:
determine one or more storage configurations related to the storage capacity of the storage nodes; and
wherein the distribution of the metadata is based on the one or more storage configurations.

13. A system comprising:
a plurality of storage nodes operated by a service provider for a plurality of clients; and
a platform server configured to create a global storage instance in response to an end user request, wherein the global storage instance contains metadata of a storage layer including all of the storage nodes operated by the service provider for a plurality of clients, and wherein the global storage instance is delocalized from the storage nodes, wherein the storage layer includes a plurality of data centers at different geographic locations; to receive a database operation request from an operating system layer; to mediate the database operation request between the operating system layer and the storage layer using the metadata of the storage nodes contained in the global storage instance; and to initiate (1) updates to the metadata of the storage nodes contained in the global storage instance based on metadata locally updated at one or more of the storage nodes that completed the database operation request, (2) a synchronization of file indexes of all of the storage nodes, and (3) an account for and a rebalance of storage space available in all of the storage nodes, upon a completion of the database operation request.

14. A system according to claim 13, wherein the platform server is further configured to designate the global storage instance as a master of one or more local storage instances associated respectively with the storage nodes.

* * * * *